US012712855B2

(12) United States Patent
Jayaraman

(10) Patent No.: US 12,712,855 B2
(45) Date of Patent: Aug. 18, 2026

(54) SYSTEM FOR CONTROLLING NETWORK DATA SHARING

(71) Applicant: Truist Bank, Charlotte, NC (US)

(72) Inventor: Barath Jayaraman, Fort Mill, SC (US)

(73) Assignee: TRUIST BANK, Charlotte, NC (US)

( * ) Notice: Subject to any disclaimer, the term of this patent is extended or adjusted under 35 U.S.C. 154(b) by 269 days.

(21) Appl. No.: 18/193,826

(22) Filed: Mar. 31, 2023

(65) Prior Publication Data

US 2024/0333690 A1 Oct. 3, 2024

(51) Int. Cl.
*H04L 9/40* (2022.01)
*G06F 21/62* (2013.01)
*H04L 67/02* (2022.01)

(52) U.S. Cl.
CPC .............. *H04L 63/04* (2013.01); *G06F 21/62* (2013.01); *G06F 21/6245* (2013.01); *H04L 67/02* (2013.01)

(58) Field of Classification Search
None
See application file for complete search history.

(56) References Cited

U.S. PATENT DOCUMENTS 9,853,959 B1 * 12/2017 Kapczynski ............ H04L 63/08
10,187,347 B2 * 1/2019 Moffat .................. H04L 9/0822
11,457,079 B1 * 9/2022 Mehta ..................... H04L 67/10
11,657,180 B1 * 5/2023 Mehta ................. G06F 21/6245 726/2
11,954,225 B1 * 4/2024 Guenther ............ G06F 21/6245
11,985,201 B1 * 5/2024 Mehta ..................... H04L 67/10
12,242,645 B2 * 3/2025 McClennen .......... G06F 3/0482
12,289,312 B2 * 4/2025 Gupta ................... H04L 63/102
12,321,497 B1 * 6/2025 Hotchkies ........... G06F 21/6263
12,333,046 B2 * 6/2025 Chintalapati ......... G06F 3/0482
12,339,999 B1 * 6/2025 Mehta .................... G06Q 20/24
2013/0185806 A1 * 7/2013 Hatakeyama ........... H04L 63/20 726/27
2014/0059695 A1 * 2/2014 Parecki ................. H04W 12/08 726/26
2015/0161210 A1 * 6/2015 Cook ..................... G06Q 30/06 707/600
2017/0142576 A1 * 5/2017 Greaves .................. H04W 4/21
2018/0241705 A1 * 8/2018 Sarafa ................... H04L 9/0827
2020/0334380 A1 * 10/2020 Jones .................... G06F 16/904
2021/0173960 A1 * 6/2021 Dao ...................... H04L 63/101
2021/0185046 A1 * 6/2021 Gupta ................. H04L 67/1095
2023/0043318 A1 * 2/2023 Selman ............... G06F 21/6209

(Continued)

OTHER PUBLICATIONS

Fallatah khalid et al, "Personal Data Stores (PDS): A Review", 2023, Sensors, 23, 1477, pp. 1-26. (Year: 2023).*

*Primary Examiner* — Lashonda Jacobs-Burton
(74) *Attorney, Agent, or Firm* — Michael A. Springs, Esq.; Shumaker, Loop & Kendrick, LLP; Patrick B. Horne

(57) ABSTRACT

A system and method for controlling network data sharing are provided. The method includes providing a computing system including at least one processor, at least one memory device including readable instructions, and at least one user device in communication with the at least one processor via a network connection. The at least one processor is configured to receive at least one data sharing preference related to user data and provide user data to at least one third-party recipient based upon the at least one data sharing preference.

14 Claims, 2 Drawing Sheets

(56) References Cited

U.S. PATENT DOCUMENTS

| | | | | |
|---|---|---|---|---|
| 2024/0005026 | A1* | 1/2024 | Finkelstein | G06F 21/6245 |
| 2024/0005029 | A1* | 1/2024 | McClennen | G06F 21/6245 |
| 2025/0005198 | A1* | 1/2025 | Mehta | G06F 3/0482 |
| 2025/0097705 | A1* | 3/2025 | Ozanian | G06N 3/0464 |

* cited by examiner

SYSTEM FOR CONTROLLING NETWORK DATA SHARING

FIELD

The invention relates generally to network data, and more particularly to a system and method for controlling network data sharing.

BACKGROUND

Data privacy, or information privacy, often refers to a specific kind of privacy linked to personal information that is provided from individuals to private enterprises in a variety of different applications. Currently, protections for personal information are sector-specific, including personal health information, educational information, children's information, and financial information, and each has different enforcement mechanisms and unique requirements on consent and disclosure. However, data privacy is ever-evolving in how personal information is used and how it is regulated. The future of data privacy will likely require greater protections and more affirmative rights for individuals.

Accordingly, it would be desirable to develop a system and method for controlling network data sharing that provide an enhanced user experience while also allowing for privacy protection and control.

BRIEF SUMMARY

In concordance and agreement with the present invention, a system and method for data sharing management that provide an enhanced user experience while also allowing for privacy protection and control, have been newly designed.

In one embodiment, a system for controlling network data sharing, the system comprises: a computing system including at least one processor and at least one memory, wherein the computing system executes computer-readable instructions; and a network connection operatively connecting the computing system to at least one user device; wherein, upon execution of the computer-readable instructions, the at least one processor is configured to: receive at least one data sharing preference related to user data; and provide user data to at least one third-party recipient based upon the at least one data sharing preference.

As aspects of some embodiments, the network connection operatively connects the computing system to the at least one third-party recipient.

As aspects of some embodiments, the at least one processor is configured to transmit the user data to the at least one third-party recipient via the network connection.

As aspects of some embodiments, the at least one processor is configured to permit access to the user data by the at least one third-party recipient via the network connection.

As aspects of some embodiments, the at least one data sharing preference is selected by a user via a graphical user interface of the at least one user device.

As aspects of some embodiments, the at least one data sharing preference includes at least one data selection.

As aspects of some embodiments, the at least one data sharing preference includes at least one third-party recipient selection.

As aspects of some embodiments, the at least one data sharing preference includes at least one frequency and/or duration selection.

As aspects of some embodiments, the at least one data sharing preference includes at least one user selection.

In another embodiment, a system for controlling network data sharing, the system comprises: a computing system including at least one processor and at least one memory, wherein the computing system executes computer-readable instructions; and a network connection operatively connecting the computing system to at least one user device having a graphical user interface; wherein, upon execution of the computer-readable instructions, the at least one processor is configured to: provide, via the graphical user interface, at least one data sharing preference related to user data for selection by at least one user; receive from the at least one user, via the graphical user interface, at least one selection of the at least one data sharing preference related to user data; generate designated user data for at least one designated third-party recipient based upon the at least one selection of the at least one data sharing preference by the at least one user; and provide the designated user data to the at least one designated third-party recipient.

In yet another embodiments, a method for controlling network data sharing, comprises the steps of: providing a computing system including at least one processor in communication with at least one database, a memory device including readable instructions, and at least one user device in communication with the at least one processor via a network connection; receiving at least one data sharing preference related to user data; and providing user data to at least one third-party recipient based upon the at least one data sharing preference.

As aspects of some embodiments, the network connection operatively connects the computing system to the at least one third-party recipient.

As aspects of some embodiments, the at least one processor is configured to transmit the user data to the at least one third-party recipient via the network connection.

As aspects of some embodiments, the at least one processor is configured to permit access to the user data by the at least one third-party recipient via the network connection.

As aspects of some embodiments, the at least one data sharing preference is selected by a user via a graphical user interface of the at least one user device.

As aspects of some embodiments, the at least one data sharing preference includes at least one data selection and at least one third-party recipient selection.

As aspects of some embodiments, the at least one data sharing preference includes at least one frequency and/or duration selection.

As aspects of some embodiments, the at least one data sharing preference includes at least one user selection.

As aspects of some embodiments, further comprises the step of providing, via a graphical user interface of the at least one user device, the at least one data sharing preference related to user data for selection by at least one user.

As aspects of some embodiments, further comprises the step of generating designated user data for at least one designated third-party recipient based upon the at least one selection of the at least one data sharing preference by at least one user.

The features, functions, and advantages that have been discussed may be achieved independently in various embodiments of the present invention or may be combined in yet other embodiments, further details of which can be seen with reference to the following description and drawings.

BRIEF DESCRIPTION OF THE DRAWINGS

The above-mentioned, and other features and objects of the inventions, and the manner of attaining them will become more apparent and the invention itself will be better understood by reference to the following description of embodiments of the invention taken in conjunction with the accompanying drawings, wherein.

DETAILED DESCRIPTION

Figure 1:
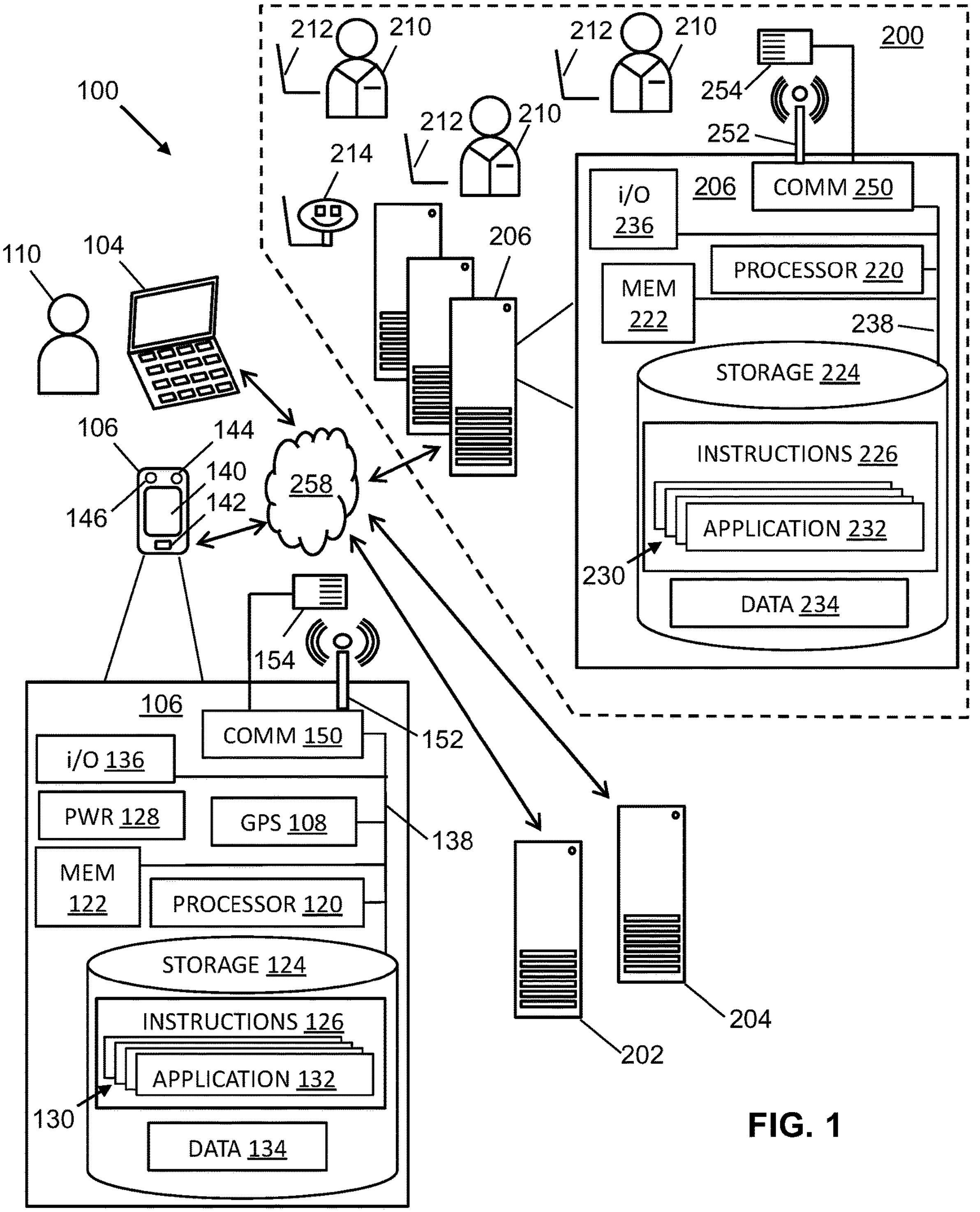
FIG. 1 is a schematic diagram illustrating an enterprise system and environment thereof for implementing a system and method for controlling network data sharing in accordance with an embodiment of the presently described subject matter.

Embodiments of the present invention will now be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure will satisfy applicable legal requirements. Like numbers refer to like elements throughout. Unless described or implied as exclusive alternatives, features throughout the drawings and descriptions should be taken as cumulative, such that features expressly associated with some particular embodiments can be combined with other embodiments. Unless defined otherwise, technical and scientific terms used herein have the same meaning as commonly understood to one of ordinary skill in the art to which the presently disclosed subject matter pertains.

The exemplary embodiments are provided so that this disclosure will be both thorough and complete, and will fully convey the scope of the invention and enable one of ordinary skill in the art to make, use, and practice the invention.

The terms “coupled,” “fixed,” “attached to,” “communicatively coupled to,” “operatively coupled to,” and the like refer to both (i) direct connecting, coupling, fixing, attaching, communicatively coupling; and (ii) indirect connecting coupling, fixing, attaching, communicatively coupling via one or more intermediate components or features, unless otherwise specified herein. “Communicatively coupled to” and “operatively coupled to” can refer to physically and/or electrically related components.

Embodiments of the present invention described herein, with reference to flowchart illustrations and/or block diagrams of methods or apparatuses (the term “apparatus” includes systems and computer program products), will be understood such that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a particular machine, such that the instructions, which execute via the processor of the computer or other programmable data processing apparatus, create mechanisms for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer readable memory produce an article of manufacture including instructions, which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions, which execute on the computer or other programmable apparatus, provide steps for implementing the functions/acts specified in the flowchart and/or block diagram block or blocks. Alternatively, computer program implemented steps or acts may be combined with operator or human implemented steps or acts in order to carry out an embodiment of the invention.

While certain exemplary embodiments have been described and shown in the accompanying drawings, it is to be understood that such embodiments are merely illustrative of, and not restrictive on, the broad invention, and that this invention not be limited to the specific constructions and arrangements shown and described, since various other changes, combinations, omissions, modifications and substitutions, in addition to those set forth in the above paragraphs, are possible. Those skilled in the art will appreciate that various adaptations, modifications, and combinations of the herein described embodiments can be configured without departing from the scope and spirit of the invention. Therefore, it is to be understood that, within the scope of the included claims, the invention may be practiced other than as specifically described herein.

FIG. 1 illustrates a system 100 and environment thereof, according to at least one embodiment, by which a user 110 benefits through use of services and products of an enterprise system 200. The environment may include, for example, a distributed cloud computing environment (private cloud, public cloud, community cloud, and/or hybrid cloud), an on-premise environment, fog computing environment, and/or an edge computing environment. The user 110 accesses services and products by use of one or more user devices, illustrated in separate examples as a computing device 104 and a mobile device 106, which may be, as non-limiting examples, a smart phone, a portable digital assistant (PDA), a pager, a mobile television, a gaming device, a laptop computer, a camera, a video recorder, an audio/video player, radio, a GPS device, or any combination of the aforementioned, or other portable device with processing and communication capabilities. In the illustrated example, the mobile device 106 is illustrated in FIG. 1 as having exemplary elements, the below descriptions of which apply as well to the computing device 104, which can be, as non-limiting examples, a desktop computer, a laptop computer, or other user-accessible computing device.

Furthermore, the user device, referring to either or both of the computing device 104 and the mobile device 106, may be or include a workstation, a server, or any other suitable device, including a set of servers, a cloud-based application or system, or any other suitable system, adapted to execute, for example any suitable operating system, including Linux, UNIX, Windows, macOS, iOS, Android and any other known operating system used on personal computers, central computing systems, phones, and other devices.

The user 110 can be an individual, a group, or any entity in possession of or having access to the user device, referring to either or both of the mobile device 104 and computing device 106, which may be personal or public items. Although the user 110 may be singly represented in some drawings, at least in some embodiments according to these descriptions the user 110 is one of many such that a market or community of users, consumers, customers, business entities, government entities, clubs, and groups of any size are all within the scope of these descriptions.

The user device, as illustrated with reference to the mobile device 106, includes components such as, at least one of each of a processing device 120, and a memory device 122 for processing use, such as random access memory (RAM), and read-only memory (ROM). The illustrated mobile device 106 further includes a storage device 124 including at least one of a non-transitory storage medium, such as a microdrive, for long-term, intermediate-term, and short-term storage of computer-readable instructions 126 for execution by the processing device 120. For example, the instructions 126 can include instructions for an operating system and various applications or programs 130, of which the application 132 is represented as a particular example. The storage device 124 can store various other data items 134, which can include, as non-limiting examples, cached data, user files such as those for pictures, audio and/or video recordings, files downloaded or received from other devices, and other data items preferred by the user or required or related to any or all of the applications or programs 130.

The memory device 122 is operatively coupled to the processing device 120. As used herein, memory includes any computer readable medium to store data, code, or other information. The memory device 122 may include volatile memory, such as volatile Random Access Memory (RAM) including a cache area for the temporary storage of data. The memory device 122 may also include non-volatile memory, which can be embedded and/or may be removable. The non-volatile memory can additionally or alternatively include an electrically erasable programmable read-only memory (EEPROM), flash memory or the like.

According to various embodiments, the memory device 122 and storage device 124 may be combined into a single storage medium. The memory device 122 and storage device 124 can store any of a number of applications which comprise computer-executable instructions and code executed by the processing device 120 to implement the functions of the mobile device 106 described herein. For example, the memory device 122 may include such applications as a conventional web browser application and/or a mobile P2P payment system client application. These applications also typically provide a graphical user interface (GUI) on the display 140 that allows the user 110 to communicate with the mobile device 106, and, for example a mobile banking system, and/or other devices or systems. In one embodiment, when the user 110 decides to enroll in a mobile banking program, the user 110 downloads or otherwise obtains the mobile banking system client application from a mobile banking system, for example enterprise system 200, or from a distinct application server. In other embodiments, the user 110 interacts with a mobile banking system via a web browser application in addition to, or instead of, the mobile P2P payment system client application.

The processing device 120, and other processors described herein, generally include circuitry for implementing communication and/or logic functions of the mobile device 106. For example, the processing device 120 may include a digital signal processor, a microprocessor, and various analog to digital converters, digital to analog converters, and/or other support circuits. Control and signal processing functions of the mobile device 106 are allocated between these devices according to their respective capabilities. The processing device 120 thus may also include the functionality to encode and interleave messages and data prior to modulation and transmission. The processing device 120 can additionally include an internal data modem. Further, the processing device 120 may include functionality to operate one or more software programs, which may be stored in the memory device 122, or in the storage device 124. For example, the processing device 120 may be capable of operating a connectivity program, such as a web browser application. The web browser application may then allow the mobile device 106 to transmit and receive web content, such as, for example, location-based content and/or other web page content, according to a Wireless Application Protocol (WAP), Hypertext Transfer Protocol (HTTP), and/or the like.

The memory device 122 and storage device 124 can each also store any of a number of pieces of information, and data, used by the user device and the applications and devices that facilitate functions of the user device, or are in communication with the user device, to implement the functions described herein and others not expressly described. For example, the storage device may include such data as user authentication information, etc.

The processing device 120, in various examples, can operatively perform calculations, can process instructions for execution, and can manipulate information. The processing device 120 can execute machine-executable instructions stored in the storage device 124 and/or memory device 122 to thereby perform methods and functions as described or implied herein, for example by one or more corresponding flow charts expressly provided or implied as would be understood by one of ordinary skill in the art to which the subject matters of these descriptions pertain. The processing device 120 can be or can include, as non-limiting examples, a central processing unit (CPU), a microprocessor, a graphics processing unit (GPU), a microcontroller, an application-specific integrated circuit (ASIC), a programmable logic device (PLD), a digital signal processor (DSP), a field programmable gate array (FPGA), a state machine, a controller, gated or transistor logic, discrete physical hardware components, and combinations thereof. In some embodiments, particular portions or steps of methods and functions described herein are performed in whole or in part by way of the processing device 120, while in other embodiments methods and functions described herein include cloud-based computing in whole or in part such that the processing device 120 facilitates local operations including, as non-limiting examples, communication, data transfer, and user inputs and outputs such as receiving commands from and providing displays to the user.

The mobile device 106, as illustrated, includes an input and output system 136, referring to, including, or operatively coupled with, one or more user input devices and/or one or more user output devices, which are operatively coupled to the processing device 120. The input and output system 136 may include input/output circuitry that may operatively convert analog signals and other signals into digital data, or may convert digital data to another type of signal. For example, the input/output circuitry may receive and convert physical contact inputs, physical movements, or auditory signals (e.g., which may be used to authenticate a user) to digital data. Once converted, the digital data may be provided to the processing device 120. The input and output system 136 may also include a display 140 (e.g., a liquid crystal display (LCD), light emitting diode (LED) display, or the like), which can be, as a non-limiting example, a presence-sensitive input screen (e.g., touch screen or the like) of the mobile device 106, which serves both as an output device, by providing graphical and text indicia and presentations for viewing by one or more user 110, and as an input device, by providing virtual buttons, selectable options, a virtual keyboard, and other indicia that, when touched, control the mobile device 106 by user action. The user output devices include a speaker 144 or other audio device. The user input devices, which allow the mobile device 106 to receive data and actions such as button manipulations and touches from a user such as the user 110, may include any of a number of devices allowing the mobile device 106 to receive data from a user, such as a keypad, keyboard, touch-screen, touchpad, microphone 142, mouse, joystick, other pointer device, button, soft key, infrared sensor, and/or other input device(s). The input and output system 136 may also include a camera 146, such as a digital camera.

Further non-limiting examples of input devices and/or output devices include, one or more of each, any, and all of a wireless or wired keyboard, a mouse, a touchpad, a button, a switch, a light, an LED, a buzzer, a bell, a printer and/or other user input devices and output devices for use by or communication with the user 110 in accessing, using, and controlling, in whole or in part, the user device, referring to either or both of the computing device 104 and a mobile device 106. Inputs by one or more user 110 can thus be made via voice, text or graphical indicia selections. For example, such inputs in some examples correspond to user-side actions and communications seeking services and products of the enterprise system 200, and at least some outputs in such examples correspond to data representing enterprise-side actions and communications in two-way communications between a user 110 and an enterprise system 200.

The input and output system 136 may also be configured to obtain and process various forms of authentication via an authentication system to obtain authentication information of a user 110. Various authentication systems may include, according to various embodiments, a recognition system that detects biometric features or attributes of a user such as, for example fingerprint recognition systems and the like (hand print recognition systems, palm print recognition systems, etc.), iris recognition and the like used to authenticate a user based on features of the user's eyes, facial recognition systems based on facial features of the user, DNA-based authentication, or any other suitable biometric attribute or information associated with a user. Additionally or alternatively, voice biometric systems may be used to authenticate a user using speech recognition associated with a word, phrase, tone, or other voice-related features of the user. Alternate authentication systems may include one or more systems to identify a user based on a visual or temporal pattern of inputs provided by the user. For instance, the user device may display, for example, selectable options, shapes, inputs, buttons, numeric representations, etc. that must be selected in a pre-determined specified order or according to a specific pattern. Other authentication processes are also contemplated herein including, for example, email authentication, password protected authentication, device verification of saved devices, code-generated authentication, text message authentication, phone call authentication, etc. The user device may enable users to input any number or combination of authentication systems.

The user device, referring to either or both of the computing device 104 and the mobile device 106 may also include a positioning device 108, which can be for example a global positioning system device (GPS) configured to be used by a positioning system to determine a location of the computing device 104 or mobile device 106. For example, the positioning system device 108 may include a GPS transceiver. In some embodiments, the positioning system device 108 includes an antenna, transmitter, and receiver. For example, in one embodiment, triangulation of cellular signals may be used to identify the approximate location of the mobile device 106. In other embodiments, the positioning device 108 includes a proximity sensor or transmitter, such as an RFID tag, that can sense or be sensed by devices known to be located proximate a merchant or other location to determine that the consumer mobile device 106 is located proximate these known devices.

In the illustrated example, a system intraconnect 138, connects, for example electrically, the various described, illustrated, and implied components of the mobile device 106. The intraconnect 138, in various non-limiting examples, can include or represent, a system bus, a high-speed interface connecting the processing device 120 to the memory device 122, individual electrical connections among the components, and electrical conductive traces on a motherboard common to some or all of the above-described components of the user device (referring to either or both of the computing device 104 and the mobile device 106). As discussed herein, the system intraconnect 138 may operatively couple various components with one another, or in other words, electrically connects those components, either directly or indirectly—by way of intermediate component(s)—with one another.

The user device, referring to either or both of the computing device 104 and the mobile device 106, with particular reference to the mobile device 106 for illustration purposes, includes a communication interface 150, by which the mobile device 106 communicates and conducts transactions with other devices and systems. The communication interface 150 may include digital signal processing circuitry and may provide two-way communications and data exchanges, for example wirelessly via wireless communication device 152, and for an additional or alternative example, via wired or docked communication by mechanical electrically conductive connector 154. Communications may be conducted via various modes or protocols, of which GSM voice calls, SMS, EMS, MMS messaging, TDMA, CDMA, PDC, WCDMA, CDMA2000, and GPRS, are all non-limiting and non-exclusive examples. Thus, communications can be conducted, for example, via the wireless communication device 152, which can be or include a radio-frequency transceiver, a Bluetooth device, Wi-Fi device, a Near-field communication device, and other transceivers. In addition, GPS (Global Positioning System) may be included for navigation and location-related data exchanges, ingoing and/or outgoing. Communications may also or alternatively be conducted via the connector 154 for wired connections such by USB, Ethernet, and other physically connected modes of data transfer.

The processing device 120 is configured to use the communication interface 150 as, for example, a network interface to communicate with one or more other devices on a network. In this regard, the communication interface 150 utilizes the wireless communication device 152 as an antenna operatively coupled to a transmitter and a receiver (together a "transceiver") included with the communication interface 150. The processing device 120 is configured to provide signals to and receive signals from the transmitter and receiver, respectively. The signals may include signaling information in accordance with the air interface standard of the applicable cellular system of a wireless telephone network. In this regard, the mobile device 106 may be configured to operate with one or more air interface standards, communication protocols, modulation types, and access types. By way of illustration, the mobile device 106 may be configured to operate in accordance with any of a number of first, second, third, fourth, fifth-generation communication protocols and/or the like. For example, the mobile device 106 may be configured to operate in accordance with second-generation (2G) wireless communication protocols IS-136 (time division multiple access (TDMA)), GSM (global system for mobile communication), and/or IS-95 (code division multiple access (CDMA)), or with third-generation (3G) wireless communication protocols, such as Universal Mobile Telecommunications System (UMTS), CDMA2000, wideband CDMA (WCDMA) and/or time division-synchronous CDMA (TD-SCDMA), with fourth-generation (4G) wireless communication protocols such as Long-Term Evolution (LTE), fifth-generation (5G) wireless communication protocols, Bluetooth Low Energy (BLE) communication protocols such as Bluetooth 5.0, ultra-wide-band (UWB) communication protocols, and/or the like. The mobile device 106 may also be configured to operate in accordance with non-cellular communication mechanisms, such as via a wireless local area network (WLAN) or other communication/data networks.

The communication interface 150 may also include a payment network interface. The payment network interface may include software, such as encryption software, and hardware, such as a modem, for communicating information to and/or from one or more devices on a network. For example, the mobile device 106 may be configured so that it can be used as a credit or debit card by, for example, wirelessly communicating account numbers or other authentication information to a terminal of the network. Such communication could be performed via transmission over a wireless communication protocol such as the Near-field communication protocol.

The mobile device 106 further includes a power source 128, such as a battery, for powering various circuits and other devices that are used to operate the mobile device 106. Embodiments of the mobile device 106 may also include a clock or other timer configured to determine and, in some cases, communicate actual or relative time to the processing device 120 or one or more other devices. For further example, the clock may facilitate timestamping transmissions, receptions, and other data for security, authentication, logging, polling, data expiry, and forensic purposes.

System 100 as illustrated diagrammatically represents at least one example of a possible implementation, where alternatives, additions, and modifications are possible for performing some or all of the described methods, operations and functions. Although shown separately, in some embodiments, two or more systems, servers, or illustrated components may utilized. In some implementations, the functions of one or more systems, servers, or illustrated components may be provided by a single system or server. In some embodiments, the functions of one illustrated system or server may be provided by multiple systems, servers, or computing devices, including those physically located at a central facility, those logically local, and those located as remote with respect to each other.

The enterprise system 200 can offer any number or type of services and products to one or more users 110. In some examples, an enterprise system 200 offers products. In some examples, an enterprise system 200 offers services. Use of "service(s)" or "product(s)" thus relates to either or both in these descriptions. With regard, for example, to online information and financial services, "service" and "product" are sometimes termed interchangeably. In non-limiting examples, services and products include retail services and products, information services and products, custom services and products, predefined or pre-offered services and products, consulting services and products, advising services and products, forecasting services and products, internet products and services, social media, and financial services and products, which may include, in non-limiting examples, services and products relating to banking, checking, savings, investments, credit cards, automatic-teller machines, debit cards, loans, mortgages, personal accounts, business accounts, account management, credit reporting, credit requests, and credit scores.

To provide access to, or information regarding, some or all the services and products of the enterprise system 200, automated assistance may be provided by the enterprise system 200. For example, automated access to user accounts and replies to inquiries may be provided by enterprise-side automated voice, text, and graphical display communications and interactions. In at least some examples, any number of human agents 210, can be employed, utilized, authorized or referred by the enterprise system 200. Such human agents 210 can be, as non-limiting examples, point of sale or point of service (POS) representatives, online customer service assistants available to users 110, advisors, managers, sales team members, and referral agents ready to route user requests and communications to preferred or particular other agents, human or virtual.

Human agents 210 may utilize agent devices 212 to serve users in their interactions to communicate and take action. The agent devices 212 can be, as non-limiting examples, computing devices, kiosks, terminals, smart devices such as phones, and devices and tools at customer service counters and windows at POS locations. In at least one example, the diagrammatic representation of the components of the user device 106 in FIG. 1 applies as well to one or both of the computing device 104 and the agent devices 212.

Agent devices 212 individually or collectively include input devices and output devices, including, as non-limiting examples, a touch screen, which serves both as an output device by providing graphical and text indicia and presentations for viewing by one or more agent 210, and as an input device by providing virtual buttons, selectable options, a virtual keyboard, and other indicia that, when touched or activated, control or prompt the agent device 212 by action of the attendant agent 210. Further non-limiting examples include, one or more of each, any, and all of a keyboard, a mouse, a touchpad, a joystick, a button, a switch, a light, an LED, a microphone serving as input device for example for voice input by a human agent 210, a speaker serving as an output device, a camera serving as an input device, a buzzer, a bell, a printer and/or other user input devices and output devices for use by or communication with a human agent 210 in accessing, using, and controlling, in whole or in part, the agent device 212.

Inputs by one or more human agents 210 can thus be made via voice, text or graphical indicia selections. For example, some inputs received by an agent device 212 in some examples correspond to, control, or prompt enterprise-side actions and communications offering services and products of the enterprise system 200, information thereof, or access thereto. At least some outputs by an agent device 212 in some examples correspond to, or are prompted by, user-side actions and communications in two-way communications between a user 110 and an enterprise-side human agent 210.

From a user perspective experience, an interaction in some examples within the scope of these descriptions begins with direct or first access to one or more human agents 210 in person, by phone, or online for example via a chat session or website function or feature. In other examples, a user is first assisted by a virtual agent 214 of the enterprise system 200, which may satisfy user requests or prompts by voice, text, or online functions, and may refer users to one or more human agents 210 once preliminary determinations or conditions are made or met.

A computing system 206 of the enterprise system 200 may include components such as, at least one of each of a processing device 220, and a memory device 222 for processing use, such as random access memory (RAM), and read-only memory (ROM). The illustrated computing system 206 further includes a storage device 224 including at least one non-transitory storage medium, such as a microdrive, for long-term, intermediate-term, and short-term storage of computer-readable instructions 226 for execution by the processing device 220. For example, the instructions 226 can include instructions for an operating system and various applications or programs 230, of which the application 232 is represented as a particular example. The storage device 224 can store various other data 234, which can include, as non-limiting examples, cached data, and files such as those for user accounts, user profiles, account balances, and transaction histories, files downloaded or received from other devices, and other data items preferred by the user or required or related to any or all of the applications or programs 230.

The computing system 206, in the illustrated example, includes an input/output system 236, referring to, including, or operatively coupled with input devices and output devices such as, in a non-limiting example, agent devices 212, which have both input and output capabilities.

In the illustrated example, a system intraconnect 238 electrically connects the various above-described components of the computing system 206. In some cases, the intraconnect 238 operatively couples components to one another, which indicates that the components may be directly or indirectly connected, such as by way of one or more intermediate components. The intraconnect 238, in various non-limiting examples, can include or represent, a system bus, a high-speed interface connecting the processing device 220 to the memory device 222, individual electrical connections among the components, and electrical conductive traces on a motherboard common to some or all of the above-described components of the user device.

The computing system 206, in the illustrated example, includes a communication interface 250, by which the computing system 206 communicates and conducts transactions with other devices and systems. The communication interface 250 may include digital signal processing circuitry and may provide two-way communications and data exchanges, for example wirelessly via wireless device 252, and for an additional or alternative example, via wired or docked communication by mechanical electrically conductive connector 254. Communications may be conducted via various modes or protocols, of which GSM voice calls, SMS, EMS, MMS messaging, TDMA, CDMA, PDC, WCDMA, CDMA2000, and GPRS, are all non-limiting and non-exclusive examples. Thus, communications can be conducted, for example, via the wireless device 252, which can be or include a radio-frequency transceiver, a Bluetooth device, Wi-Fi device, Near-field communication device, and other transceivers. In addition, GPS (Global Positioning System) may be included for navigation and location-related data exchanges, ingoing and/or outgoing. Communications may also or alternatively be conducted via the connector 254 for wired connections such as by USB, Ethernet, and other physically connected modes of data transfer.

The processing device 220, in various examples, can operatively perform calculations, can process instructions for execution, and can manipulate information. The processing device 220 can execute machine-executable instructions stored in the storage device 224 and/or memory device 222 to thereby perform methods and functions as described or implied herein, for example by one or more corresponding flow charts expressly provided or implied as would be understood by one of ordinary skill in the art to which the subjects matters of these descriptions pertain. The processing device 220 can be or can include, as non-limiting examples, a central processing unit (CPU), a microprocessor, a graphics processing unit (GPU), a microcontroller, an application-specific integrated circuit (ASIC), a programmable logic device (PLD), a digital signal processor (DSP), a field programmable gate array (FPGA), a state machine, a controller, gated or transistor logic, discrete physical hardware components, and combinations thereof.

Furthermore, the computing device 206, may be or include a workstation, a server, or any other suitable device, including a set of servers, a cloud-based application or system, or any other suitable system, adapted to execute, for example any suitable operating system, including Linux, UNIX, Windows, macOS, iOS, Android, and any known other operating system used on personal computer, central computing systems, phones, and other devices.

The user devices, referring to either or both of the computing device 104 and mobile device 106, the agent devices 212, and the enterprise computing system 206, which may be one or any number centrally located or distributed, are in communication through one or more networks, referenced as network 258 in FIG. 1.

Network 258 provides wireless or wired communications among the components of the system 100 and the environment thereof, including other devices local or remote to those illustrated, such as additional mobile devices, servers, and other devices communicatively coupled to network 258, including those not illustrated in FIG. 1. The network 258 is singly depicted for illustrative convenience, but may include more than one network without departing from the scope of these descriptions. In some embodiments, the network 258 may be or provide one or more cloud-based services or operations. The network 258 may be or include an enterprise or secured network, or may be implemented, at least in part, through one or more connections to the Internet. A portion of the network 258 may be a virtual private network (VPN) or an Intranet. The network 258 can include wired and wireless links, including, as non-limiting examples, 802.11a/b/g/n/ac, 802.20, WiMax, LTE, and/or any other wireless link. The network 258 may include any internal or external network, networks, sub-network, and combinations of such operable to implement communications between various computing components within and beyond the illustrated environment 100. The network 258 may communicate, for example, Internet Protocol (IP) packets, Frame Relay frames, Asynchronous Transfer Mode (ATM) cells, voice, video, data, and other suitable information between network addresses. The network 258 may also include one or more local area networks (LANs), radio access networks (RANs), metropolitan area networks (MANs), wide area networks (WANs), all or a portion of the internet and/or any other communication system or systems at one or more locations.

The network 258 may incorporate a cloud platform/data center that support various service models including Platform as a Service (PaaS), Infrastructure-as-a-Service (IaaS), and Software-as-a-Service (SaaS). Such service models may provide, for example, a digital platform accessible to the user device (referring to either or both of the computing device 104 and the mobile device 106). Specifically, SaaS may provide a user with the capability to use applications running on a cloud infrastructure, where the applications are accessible via a thin client interface such as a web browser and the user is not permitted to manage or control the underlying cloud infrastructure (i.e., network, servers, operating systems, storage, or specific application capabilities that are not user-specific). PaaS also do not permit the user to manage or control the underlying cloud infrastructure, but this service may enable a user to deploy user-created or acquired applications onto the cloud infrastructure using programming languages and tools provided by the provider of the application. In contrast, IaaS provides a user the permission to provision processing, storage, networks, and other computing resources as well as run arbitrary software (e.g., operating systems and applications) thereby giving the user control over operating systems, storage, deployed applications, and potentially select networking components (e.g., host firewalls).

The network 258 may also incorporate various cloud-based deployment models including private cloud (i.e., an organization-based cloud managed by either the organization or third parties and hosted on-premises or off premises), public cloud (i.e., cloud-based infrastructure available to the general public that is owned by an organization that sells cloud services), community cloud (i.e., cloud-based infrastructure shared by several organizations and manages by the organizations or third parties and hosted on-premises or off premises), and/or hybrid cloud (i.e., composed of two or more clouds e.g., private community, and/or public).

Two external systems 202 and 204 are expressly illustrated in FIG. 1, representing any number and variety of data sources, users, consumers, customers, business entities, banking systems, government entities, clubs, and groups of any size are all within the scope of the descriptions. In at least one example, the external systems 202 and 204 represent automatic teller machines (ATMs) utilized by the enterprise system 200 in serving users 110. In another example, the external systems 202 and 204 represent payment clearinghouse or payment rail systems for processing payment transactions, and in another example, the external systems 202 and 204 represent third party systems such as merchant systems configured to interact with the user device (referring to either or both of the computing device 104 and the mobile device 106) during transactions and also configured to interact with the enterprise system 200 in back-end transactions clearing processes.

In certain embodiments, one or more of the systems such as the user device (referring to either or both of the computing device 104 and the mobile device 106), the enterprise system 200, and/or the external systems 202 and 204 are, include, or utilize virtual resources. In some cases, such virtual resources are considered cloud resources or virtual machines. The cloud computing configuration may provide an infrastructure that includes a network of interconnected nodes and provides stateless, low coupling, modularity, and semantic interoperability. Such interconnected nodes may incorporate a computer system that includes one or more processors, a memory, and a bus that couples various system components (e.g., the memory) to the processor. Such virtual resources may be available for shared use among multiple distinct resource consumers and in certain implementations, virtual resources do not necessarily correspond to one or more specific pieces of hardware, but rather to a collection of pieces of hardware operatively coupled within a cloud computing configuration so that the resources may be shared as needed.

The present invention relates to a method of operating the described enterprise system 200 for interacting with a corresponding user 110 accessing a mobile banking platform associated with the enterprise system 200. As used herein, the mobile banking platform generally refers to a platform that is accessible to the user 110 via an appropriate network connection, such as a mobile banking website or a mobile banking application. If the mobile banking platform refers to a mobile banking website, the user 110 may access the website via an appropriate browser software application operating on the corresponding user device (referring to either or both of the computing device 104 and the mobile device 106), wherein navigation of the mobile banking website provides the user 110 access to certain data regarding the user 110 as maintained by the enterprise system 200. If the mobile banking platform refers to a mobile banking software application, the user 110 may access the mobile banking software application via the corresponding (referring to either or both of the computing device 104 and the mobile device 106) for access to the data regarding the user 110 as maintained by the enterprise system 200 in the absence of the operation of the previously described browser application. The mobile banking software application may be representative of the previously described application 132 operable on the user device (referring to either or both of the computing device 104 and the mobile device 106), as one non-limiting example.

It is generally assumed hereinafter that the same features of the mobile banking platform may be accessible via use of the website accessible via the browser application or the direct use of the mobile banking software application, unless specified otherwise. It should also be generally understood that the website and the software application may generally include the display of the same data regarding the user 110, but may in some circumstances include a different arrangement of such data to best accommodate the configuration of the corresponding (referring to either or both of the computing device 104 and the mobile device 106), such as accommodating a specific screen configuration or a specific user input method. The mobile banking platform is described hereinafter as being "interacted with" by the user 110 during navigation thereof. It should be understood that such interactions may refer to any suitable interactions capable as acting as an input to the corresponding (referring to either or both of the computing device 104 and the mobile device 106), such as a corresponding touch screen interaction, mouse button click, keyboard stroke, voice activated command, or the like, as the circumstances may warrant. Such interactions are generally understood to correspond to a selection of an identifiable area of the display of the mobile banking platform, such as corresponding to a specific image, video display, text, or other representation of data, which in turn redirects the platform to change the data instantaneously displayed to the user 110 via a reconfiguration of the corresponding graphical user interface.

The mobile banking platform is shown and described hereinafter with reference to the navigation of a dedicated mobile banking software application 132 as may be executed on the user device 106 having the described display 140 acting as the graphical user interface thereof. However, as described above, it should be readily apparent that the same features may be applied to the corresponding software application or browser application during use of the user device 104 and any associated input or output devices thereof such as a graphical user interface thereof, for example.

As mentioned hereinabove, each of the users 110 described herein may be a person or entity acting as a customer or client of the enterprise system 200 that utilizes products and/or services from the enterprise system 200 as defined herein, or may otherwise be a person or entity having an established relationship with the enterprise system 200 such that the enterprise system 200 has access to the necessary personal data regarding each of the participating users 110 (also referred to herein as "user data") for making the determinations described hereinafter. The relationship present between the enterprise system 200 and a corresponding user 110 may include the user 110 having a user account with the enterprise system 200 wherein certain actions of the user 110, actions of the enterprise system 200, and/or interactions between the enterprise system 200 and the user 110 may be monitored and recorded by the computing system 206 of the enterprise system 200. Such data of each of the users 110 of the enterprise system 200 may be in the form of the data 234 stored to the storage device 224 of the computing system 206 as utilized for carrying out the functions of the mobile banking platform as described herein. The data 234 may originate from various different sources including the recorded interactions of the user 110 with the enterprise system 200 and/or the recorded interactions of the user 110 with one or more third-party and external sources or systems, which may be representative of the previously disclosed external systems 202, 204.

The user account of each corresponding user 110 may refer to a primary or umbrella account of the user 110 from which data corresponding to various additional or subaccounts is accessible during navigation of the mobile banking platform. For example, upon providing the necessary login credentials to access the corresponding user account via the mobile banking platform, the logged-in user 110 may then be able to access each of a variety of different financial accounts maintained by the enterprise system 200 and associated with the user 110. As one non-limiting example, the user account of the user 110 may include access to each of a checking account, a savings account, and a credit card account, each of which is maintained or monitored in some form by the enterprise system 200 and associated with the user 110. However, the user account may include access to any form of financial account including a record of financial transactions associated with the financial account, such as debits, credits, or transfers between accounts, among other possible transactions. Each transaction of a corresponding financial account may be associated with certain data, such as a corresponding monetary amount and/or date of transaction, by which such transactions may be appropriately categorized or otherwise sorted.

The personal data accessible to the enterprise system 200 regarding the user 110 may include data regarding products and/or services offered to the user 110 by the enterprise system 200 relating to banking, checking, savings, investments, credit cards, automatic-teller machines, debit cards, loans, mortgages, personal accounts, business accounts, account management, credit reporting, credit requests, and credit scores, as non-limiting examples. The data may further include files such as those for user accounts, user profiles, user account balances, user transaction histories, user investment portfolios, past communications with the user, or files downloaded or received from other devices such as the user devices 104, 106 of the user 110.

The present invention described hereinafter may utilize data sets associated with the users 110 of the enterprise system 200. Each of the users 110 may be a person or entity acting as a customer or client of the enterprise system 200 that utilizes products and/or services originating at least in part from the enterprise system 200 as defined herein, or may otherwise be a person or entity having an established relationship with the enterprise system 200 such that the enterprise system 200 has access to the necessary personal data regarding each of the participating users 110 for making the determinations described hereinafter. The relationship present between the enterprise system 200 and each of the users 110 may include one or more of the users 110 having an account with the enterprise system 200 wherein certain interactions between the enterprise system 200 and each of the users 110 may be monitored and recorded by the computing system 206, as described in greater detail herein. Alternatively, if not already customers or clients, one or more of the users 110 may be representative of persons or entities that are considered to be potential or prospective customers or clients, such as those persons or entities for which the computing system 206 has the necessary data allowing for the enterprise system 200 to identify and then communicate with the corresponding person or entity to tender such products and/or services.

The personal data of each of the users 110 of the enterprise system 200 may be in the form of the data 234 stored to the storage device 224 of the computing system 206. The data 234 may originate from various different sources including the responses of the user 110 to queries from the enterprise system 200, the recorded interactions of the user 110 with the enterprise system 200, or one or more third-party and external sources or systems, which may be representative of the previously disclosed external systems 202, 204.

The present invention may also rely upon the enterprise system 200 having access to the personal data associated with each associated user 110. In some embodiments, the invention may be carried out with respect to the user 110 having an established account with the enterprise system 200, wherein the establishment of an account may include the user 110 providing at least some of the entries of the associated personal data to the enterprise system 200. The enterprise system 200 may collect data regarding the user 110 by directly querying and recording the responses of the user 110. Such data may be entered via use of the web browser application or software application 132 associated with the enterprise system 200, and such information may be entered by the user 110 via use of the user device (referring to either or both of the computing device 104 and a mobile device 106) executing the corresponding application 132. The data provided to the enterprise system 200 regarding the user 110 may include, as non-limiting examples, the gender, age, income level, employment status, home ownership status, marital status, citizenship status, etc. of the user 110. Any available demographic data regarding the user 110 may form a portion of the personal data with respect to the user 110.

When the enterprise system 200 is representative of a financial institution or mobile banking system, the personal data accessible to the enterprise system 200 regarding the user 100 may include data regarding products and/or services tendered to the user 110 by the enterprise system 200 relating to banking, checking, savings, investments, credit cards, automatic-teller machines, debit cards, loans, mortgages, personal accounts, business accounts, account management, credit reporting, credit requests, and credit scores, as non-limiting examples. The data may further include files such as those for user accounts, user profiles, user account balances, user transaction histories, user investment portfolios, past communications with the user, or files downloaded or received from other devices such as the user device (referring to either or both of the computing device 104 and a mobile device 106) of the user 110.

In some circumstances, such as when the enterprise system 200 is representative of a financial institution or mobile banking system tendering typical banking services and products, the enterprise system 200 may have access to data regarding the transactions of the user 110 as facilitated by the enterprise system 200. For example, transaction histories regarding purchases carried out via a credit card or debit card associated with the enterprise system 200 may be accessible to the computing system 206, as well as current or prior account balances of such accounts.

The enterprise system 200 may also be configured to monitor and record specific interactions of the user 110 with the enterprise system 200 in attaining additional data regarding the user 110. For example, in the event that the user 110 has an account with the enterprise system 200, the user 110 may be required to provide authentication data to the web browser application or software application 132 associated with the enterprise system 200. Following such a login process, the enterprise system 200 may monitor and record the interactions of the identified user 110 with the interface of the corresponding application 132 in order to accumulate data associated with the user 110. For example, the enterprise system 200 may monitor data such as the number of logins to the account of the user 110 in a specified period of time, the frequency of the logins of the user 110, the duration of time the user 110 remains logged into the application 132 (while remaining active), and the types of products and/or services interacted with and/or purchased by the user 110 via navigation of the corresponding application 132. Data may also be recorded regarding the navigation of the application 132, such as recording which resources the user 110 has accessed, how long such resources were accessed, or the like, such as referencing which web addresses associated with the application 132 have been accessed by the user 110 or which files related to the application 132 have been accessed by the user 110.

The personal data regarding the user 110 may also include data relating to the account settings of the user 110 as established with respect to the computing system 206. Such account setting data may be stored to the storage device 224 of the computing system 206 and may be associated with determining how the computing system 206 interacts with the user 110 via the user device (referring to either or both of the computing device 104 and a mobile device 106). For example, such account setting data may include data relating to the frequency of communications sent from the computing system 206 to the user 110 for access via the user device (referring to either or both of the computing device 104 and a mobile device 106), under what conditions to communicate with the user 110, the content of such communications, the types or forms of such communications, the manner in which the interface of the web browser application or software application 132 displays information to the user 110, or the information or resources accessible to the user 110 via navigation of the web browser application or software application 132, as non-limiting examples.

In other circumstances, the personal data may be representative of data acquired regarding the user 110 during web related activities, such as tracking a web browsing history of the user 110, as may be provided by "cookies" or similar tools, or tracking certain communications of the user 110, such as monitoring certain aspects of the email activity of the user 110. If web related activities are monitored, such data may correspond to the activities of the user 110 with respect to the webpage or software application 132 associated with the enterprise system 200 or may relate to the activities of the user 110 with respect to third party applications or websites. Such data may be communicated from the user device (referring to either or both of the computing device 104 and a mobile device 106) used to perform the web browsing to the computing system 206 for storage to the storage device 224 as a form of the data 234.

The enterprise system 200 may also utilize data originating from one of the external systems 202, 204, which may be representative of personal data accumulated with respect to the user 110 external to the enterprise system 200 that is available to or otherwise accessible by the computing system 206 via interaction with one or more of the external systems 202, 204. The external systems 202, 204 may accordingly be representative of third-party data providers configured to communicate data to the computing system 206 regarding the user 110. Such data may include a credit history of the user 110 or transactions of the user 110 with respect to other business entities, as may originate from sources others than the enterprise system 200. Further examples include data originating from third party social networks or the like, such as check-ins at certain establishments, social connections to other users, posting or commenting histories, or interactions with certain other users or business entities. Data regarding a transaction history of the user 110, whether derived from the relationship between the user 110 and the enterprise system 200 or the user 110 and a third party external system 202, 204, may include data regarding the establishments at which the user 110 has made the purchases, the amounts of such purchases, and potentially additional information regarding the products and/or services related to such purchases. Such data may be available via records of the credit or debit purchases made by the user with respect to certain establishments as monitored by the third party external systems 202, 204.

The personal data collected with respect to each user 110 may be categorized as demographic data regarding the user 110, behavioral data regarding the activities of the user 110, and behavioral data regarding the activities of the enterprise system 200 with respect to the user 110 (such as data relating to communications from the enterprise system 200 to the user 110 regarding educational materials or data relating to tenders for the purchase of products and/or services). The demographic data generally refers to the data regarding the user 110 that corresponds to a trait or characteristic of the user 110 by which the user 110 may be categorized or classified, whereas the behavioral data generally refers to data regarding the recordation of information regarding the actions of the user 110, the actions of the enterprise system 200, or past interactions or transactions occurring between the enterprise system 200 and the user 110.

The personal data associated with at least some of the users 110 may also include at least one entry of response data, wherein such response data may refer to data regarding the response(s) of the participating users 110 of the enterprise system 200 to one or more queries. Each of the users 110 may be alternatively referred to as a respondent of one or more of the queries when discussing the querying process hereinafter. The response data may be available for only some of the plurality of the users 110 of the enterprise system 200, depending on the responsiveness of such users 110 to such queries or the distribution of such queries being posed to the plurality of the users 110. As used herein, a query may refer to any question answered by a respondent for the purpose of collecting data regarding the opinions, feelings, thoughts, beliefs, impressions, predictions, and/or observations of the respondent. The response data may be accumulated using any known method so long as the response data is recorded in a form configured for use with the computing system 206 and the corresponding machine learning model executed thereon. In some embodiments, the querying of each of the users 110 may be conducted online via the web browser or software application 132 corresponding to the enterprise system 200 as operating on the user device (referring to either or both of the computing device 104 and a mobile device 106) of the respondent user 110, as explained in greater detail hereinafter.

Each of the queries may be linked to a corresponding campaign as tendered by the enterprise system 200 or an affiliate thereof, hence the users 110 having provided such responses may be indicative of those users 110 having participated in such campaigns. In some circumstances, the corresponding campaign has some connection or relationship to a specific topic and/or event. Such a relationship may be utilized in the campaign or may include an object of the campaign having a specific relationship to the topic in question. The manner in which the campaign and/or the object of the campaign is related to a specific topic may aid in providing increased engagement of each participating user 110 by relating to a topic of interest to the user 110, or to a topic of perceived knowledge of the user 110. Such increased engagement may lead to an increased likelihood of participation in the corresponding campaign, and hence access to the query or queries associated with such campaign.

The queries may alternatively relate to collecting or updating certain demographic or behavioral data regarding the user 110 that has otherwise been unable to be collected/updated. Such responses may accordingly aid in providing further correlations to similar users 110 by expanding the data set upon which correlations can be discovered and implemented.

The queries may directly relate to the preferences of the user 110 regarding certain account settings or other interactions with the computing system 206 and/or enterprise system 200. For example, a query may request the impressions of the user 110 on the performance of the enterprise system 200 in meeting the needs of the user 110 with respect to certain products and/or services tendered by the enterprise system 200. As another example, a query may relate to the preferences of the user 110 regarding the number, form, and content of certain communications sent to the user 110 by the computing system 206 as may be represented in the account settings of the user 110, such as a preference for paperless communication.

The queries are not necessarily limited to being associated with a specific campaign or topic of interest. In some circumstances, the queries may be associated with a survey proactively tendered to at least some of the users 110 for attaining additional personal data regarding any of the disclosed forms of personal data herein.

Although the response data has been described as originating from the interactions between the user 110 and the computing system 206 of the enterprise system 200, the response data may originate from any source without necessarily departing from the scope of the present invention. In some embodiments, the querying is conducted by the enterprise system 200 according to any of the processes discussed above, and the resulting response data is stored to the storage device 224 as one form of the data 234 associated therewith. In other embodiments, the response data is accumulated by a third party associated with the campaign and/or corresponding survey (or the like), and the resulting response data is communicated to the storage device 224 for storage as a form of the data 234. The third party conducting the querying and accumulating the response data may be representative of one of the external systems 202, 204 shown and described as being in communication with the computing system 206 with reference to FIG. 1. In such a circumstance, the user device (referring to either or both of the computing device 104 and a mobile device 106) of the user 110 may be utilized to respond to the queries via the web browser application or via a software application associated with the third party external system 202, 204 responsible for making the queries, and such data may be communicated from the external system 202, 204 to the computing system 206 by any known method, or may alternatively be communicated directly from the user device (referring to either or both of the computing device 104 and a mobile device 106) to the computing system 206, as desired.

The response data associated with each individual user 110, which may be a subset of the personal data of that same user 110, may include a data entry with respect to each query asked of and answered by the user 110. In some circumstances, only a single query or single set of queries asked substantially contemporaneously may form the response data of the user 110, whereas in other circumstances, the user 110 may include response data entries with respect to a plurality of independently conducted campaigns/surveys, each of which may be associated with one or more response data entries, depending on the format of the campaign/survey and the types of queries posed. Accordingly, the personal data associated with any individual user 110 may include entries of any of the different types of data disclosed hereinabove, including entries relating to demographic data, behavioral data, and response data. Each entry of the personal data may be representative of one of the demographic traits of the user 110, one of the behavioral traits of the user 110, one of the behavioral traits of the computing system 206, or one of the responses of the user 110 to a corresponding query. The number or types of entries available in the personal data may vary among users 110 depending on the relationship to the enterprise system 200 and the availability of such data, as well as the participation of such users 110 in responding to such queries as a result of participation in the corresponding campaign/survey. Some entries of the personal data of some users 110 may accordingly be empty or may include assumed or predicted data, as desired, when utilized by a machine learning model.

As used in various examples hereinafter, the personal data of at least one of the users 110 may include at least one data entry related to a past purchase or an ongoing use (active status) of a product and/or service by the user 110 as tendered by the enterprise system 200, or to the lack of the purchase or use of such a product and/or service by the user 110. The personal data of at least one of the users 110 may also include at least one data entry related to the frequency of use or manner of use of a certain product and/or service provided by the enterprise system 200 for use by the user 110. The product and/or service for which the frequency or classification of use is collected may correspond to the previously mentioned product and/or service for which the data regarding the past purchase or ongoing use is collected. The personal data of the user 110 may also include data entries relating to the lack of purchase and/or use of other products and/or services also provided by the enterprise system 200, such as alternative financial products and/or services that the user 110 is not currently utilizing. The personal data of the user 110 may also, where applicable, include data entries relating to the purchase and/or use of products and/or services provided by a third-party entity, such as entities representative of competitors to the enterprise system 200. As evidenced by the examples set forth hereinafter, it should be appreciated that the personal data associated with each of the users 110 may include any combination of the data described as being available to the computing system 206 herein while remaining within the scope of the present invention.

Operations of the method, and combinations of operation in the method, may be implemented by various means, such as hardware, firmware, processor, circuitry and/or other device associated with execution of software including one or more computer program instructions. For example, one or more of the procedures described in various embodiments may be embodied by computer program instructions. In an example embodiment, the computer program instructions, which embody the procedures, described in various embodiments may be stored by at least one memory device of a system and executed by at least one processor in the system. Any such computer program instructions may be loaded onto a computer or other programmable system (for example, hardware) to produce a machine, such that the resulting computer or other programmable system embody means for implementing the operations specified in the method.

One of the programs 230 of the enterprise system 200 may be a data sharing application 232. The data sharing application 232 may be used by the enterprise system 200 to provide the users 110 with enhanced sharing capabilities of the personal data while also providing increased protection and control thereof. The data sharing application 232 may interact with or be integrated into the dedicated banking software application 132 as may be executed on the user device (referring to either or both of the computing device 104 and the mobile device 106) through various processes and components such as the graphical user interfaces (GUIs) thereof.

Figure 2:
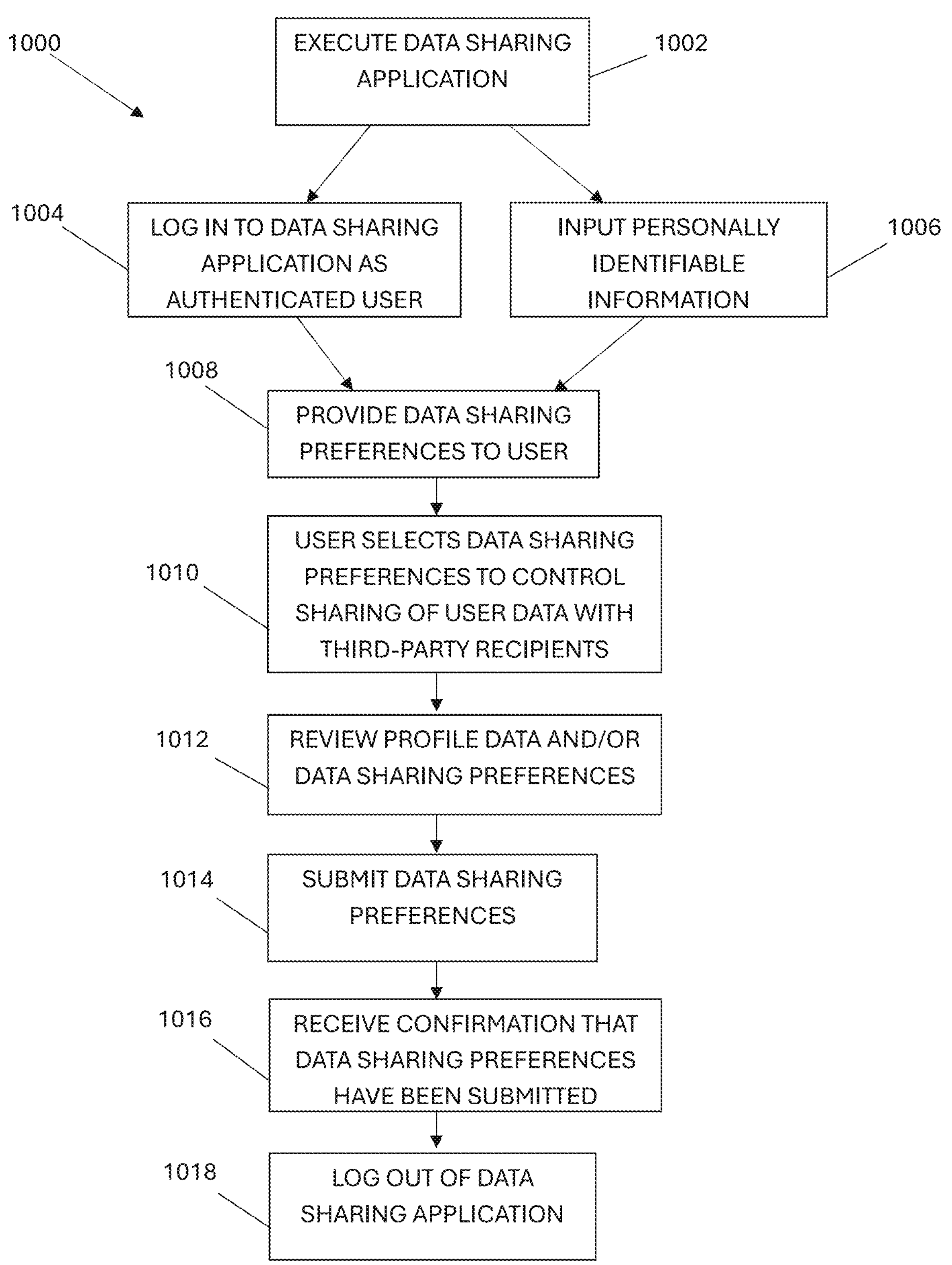
FIG. 2 is a flow diagram illustrating a method for controlling network data sharing.

FIG. 2 is a flow diagram depicting an exemplary method 1000 for controlling network data sharing in accordance with an embodiment of the present disclosure. The method 1000 depicted may be executed by an application of a system, for example, the data sharing application 232 of the enterprise system 200 of FIG. 1. In an example embodiment, the data sharing application 232 may be accessed and/or executed via a computing device, for example, the user device (referring to either or both of the computing device 104 and the mobile device 106) of FIG. 1.

In step 1002 of the method 1000 shown in FIG. 2, the user 110 executes the data sharing application 232 using the application of the system (e.g., the software application 132) of user device (referring to either or both of the computing device 104 and the mobile device 106), via the GUI. In step 1004, the user 110, via the GUI, may need to log into the data sharing application 232 as an authenticated user 110. Various credentials may be required such a username and a password in order to further access the data sharing application 232. Alternatively, to proceed when the user 110 is unauthenticated, the user 110, in step 1006, may be required to input personally identifiable information (PII) data (e.g., first name, last name, social security number, telephone number, email, date of birth, address, city, state, zip code, identification document number, and the like), via the GUI, into the data sharing application 232.

At step 1008, the data sharing application 232, via the GUI, may provide one or more data sharing preferences for the personal data of the user 110 directly to the user 110 on a personal dashboard, a data activity screen (e.g., a user account screen), on a separate network data control screen, or through various other screens or pages of the data sharing application 232. The data sharing application 232 may also display, via the GUI, previously set data sharing preferences of the user 110.

In some embodiments, the data sharing application 232, at step 1010, allows the user 110 to set desired data sharing preferences to control sharing of the personal data of the user 110 with one or more third-party recipients. It should be understood that the term "set" may include edit, delete, add, and the like, unless otherwise specified herein. The data sharing application 232 may be configured to share the personal data of the user 110 with the third-party recipients by transmitting the personal data to the third-party recipients and/or permitting the personal data to be accessed and/or downloaded by the third-party recipients. It should be appreciated that other suitable methods of sharing the personal data with the third-party recipients may be employed, if desired. The third-party recipients may be in communication with the data sharing application 232 through the network 258 of various other means of communication. In some embodiments, the third-party recipients may include, but are not limited to, generic third-party recipients provided by the data sharing application 232 for all users 110, third-party recipients generated by the data sharing application 232 based upon the personal data of the corresponding user 110 and/or a machine learning program, and/or third-party recipients inputted by the corresponding user 110 into the data sharing application 232. In some instances, the GUI of the data sharing application 232 may include a text box configured to receive an identity of a third-party recipient.

As a non-limiting example, the third-party recipients may include software applications configured to provide personal financial management to the user 110. Such financial management software applications may use the shared personal data to help the user 110 to understand and grow net worth, perform spending analysis, lower bills, provide budget analysis to improve a credit score of the user 110, and the like. As another non-limiting example, the third-party recipients may include financial advisors or brokers, accountants, and/or various other representatives, of the user 110. The financial advisors or brokers, accountants, and/or various other representatives may use the shared personal data to assist in providing investment and tax advice, estate planning, and the like, to the user 110.

Examples of the personal data of the user 110 that may shared with the third-party recipients by the data sharing application 232 may include date of birth, e-mail address, residential address, and mobile numbers, for example. The personal data of the user 110 may also include data that can pose a risk or affect the user 110 financially or otherwise, if disclosed in public. In an embodiment, the personal data may include domain specific fields, and can be generated by the enterprise system 200. Examples of the personal data for a financial institution such as a bank may include financial information such as debit and/or credit card numbers, CVV number, card balances, card expiry date, card transactions, user account numbers, user account balances, user account transactions, and other such fields, for example. The personal data of the user 110 may be provided by various data sources of the data sharing application 232.

In some embodiments, the user 110 may select which data sharing preferences provided by the data sharing application 232, via the GUI, are desired. Since the data sharing application 232 and/or the enterprise system 200 is extensible and flexible, the data sharing preferences provided are not static preferences, and can be updated by adding new preferences and/or deleting the existing preferences, or replacing preferences with the new preferences. The GUI of the data sharing application 232 may further include a text box configured to receive an unidentified data sharing preference from the user 110.

In some embodiments, the data sharing preferences provided by the data sharing application 232 are independent of the user 110 and/or the third-party recipients designated as described hereinafter. In other embodiments, the data sharing preferences provided may be dependent and associated with a specific user 110 and/or the third-party recipients designated. Various data sharing preferences may include, but are not limited to, data selections, third-party recipient selections, frequency and/or duration selections, and user selections, for example. In some embodiments, the data selections may permit the user 110 to designate the personal data (e.g., user account numbers, categories of user transactions, specific user transactions, user account balances, etc.) to share and/or the personal data not to share. Similarly, the third-party recipient selections permit the user 110 to designate the third-party recipients (e.g., categories of third-party recipients, specific third-party recipients, etc.) to which the personal data is shared and/or the third-party recipients to which the personal data is not shared. The frequency and/or duration selections permit the user 110 to set a desired frequency (e.g., daily, weekly, bi-weekly, monthly, quarterly, semi-annually, annually, etc.) and/or a desired duration (e.g., three months, six months, one year, three years, etc.) at which the designated personal data is shared with the designated third-party recipients. Further, in the event that the personal data is associated with more than one user 110, for example, a joint account, the user selections permit the user 110 to designate one or more of the users 110 to only allow the sharing of the personal data associated with the designated users 110.

In one non-limiting example, the user 110 may designate certain account transactions to be shared with specific third-party recipients and other account transactions to remain private. As another non-limiting example, the user 110 may designate certain categories of personal data (e.g., user account transactions) to be shared with specific third-party recipients and other categories of personal data to remain private. In yet another non-limiting example, the user 110 may designate the personal data (e.g., user account transactions) associated with specific or certain categories of third-party entities (e.g., retailers, financial institutions, service providers, etc.) to be shared with specific third-party recipients and/or the personal data associated with other third-party entities to remain private.

Each of the data sharing preferences may be associated with a control element such as a check box, a radio button, a toggle button, and the like. It is understood that various other types of control elements or means of selection may be employed such as a drop-down list, for example.

Once the data sharing preferences have been set, a review of a profile data and/or the data sharing preferences of the user 110 may be requested at step 1012. Upon completion of the review, the user 110 may submit the data sharing preferences at step 1014. Thereafter, in step 1016, the user 110 may receive confirmation that the data sharing preferences have been submitted. It is understood that steps 1014 through 1016 are not necessary for operation of the data sharing application 232, and therefore, may not be included therein. At step 1018, the user 110 may then logout of the data sharing application 232. The data sharing preferences and/or the date and/or time of submission of the data sharing preferences may be stored as user data 234 or other data in the storage device 224 of the enterprise system 200.

Once the data sharing preferences are set by the user 110, the computing system 206 generates the designated personal data for each of the designated users 110 to be shared with each of the designated third-party recipients. It should be appreciated that the computing system 206 is configured to generate the designated personal data for each of the designated users 110 to be shared with each of the designated third-party recipients at the designated frequency and/or for the designated duration. In certain embodiments, once the data sharing preferences for the user 110 are submitted, the data sharing application 232 and/or the enterprise system 200 may transmit the data sharing preferences to one or more human agents 210 via the network 258, to generate, at the designated frequency and/or for the designated duration, the designated personal data for each of the designated users 110 to be shared with each of the designated third-party recipients.

The data sharing application 232 and/or the enterprise system 200, either directly and/or through the one or more human agents 210, may then connect and/or communicate with the designated third-party recipients to share the designated personal data of the user 110 thereto. As described hereinabove, the designated personal data of the user 110 may be shared by various means, including but not limited to, transmitting the designated personal data of the user 110 to the designated third-party recipients and/or permitting access and/or downloading thereof by the third-party recipients. In some instances, the one or more human agents 210 of the enterprise system 200 may utilize the network 258 and/or one or more application programing interfaces (APIs) to control the sharing of the personal data of the user 110 with the third-party recipients. The one or more human agents 210 may receive at least one communication and/or confirmation from the designated third-party recipients that the designated personal data for the designated user 110 at the designated frequency and/or duration has been shared.

Authorization documentation upload may also be provided by the data sharing application 232 to permit the user 110 to submit user identification documentation to the data sharing application 232, In some instances, the upload of the authorization documentation may be achieved via the GUI. The GUI and/or the data sharing application 232 may include a browse feature that permits a search of the files of the user device (referring to either or both of the computing device 104 and the mobile device 106). In some embodiments, the data sharing application 232 may determine whether the authorization documentation is required to be submitted. If yes, the data sharing application 232 may transmit a request for such documentation to the user 110. Upon submission of the authorization documentation may be examined for legality. If the submitted authorization documentation is determined to be legally insufficient, a communication containing notification of a decline of the authorization documentation may be transmitted to the user 110. It is understood that the communication containing the notification of the decline of the authorization documentation may be automatically generated. Conversely, if the submitted authorization documentation is determined to be legally sufficient, the data sharing application 232 proceeds.

The data sharing application 232 may be a mechanism to enable a broader, more dynamic use of the personal data of the user 110. More importantly, the data sharing application 232 provides a positive user experience. Features of the data sharing application 232 are expandable as user expectations and privacy regulations evolve over time.

The use of the data sharing application 232 also improves the efficiency of the human agents 210 and operation of the computing system 206 in various different respects. First, the disclosed method eliminates unnecessary time, effort, and communications relating to certain tasks performed by the human agents 210 and/or the computing system 206 that have been found to not have a positive impact on securing desired product and/or services from the users 110. This may be especially relevant where extensive costs can be avoided by sending communication of various forms to correct users 110, as well as verifying requestor credentials and filtering the personal data of the user 110 prior to transmittal of any communication. This results in the human agents 210 and the computing system 206 avoiding a waste of resources when performing certain tasks, such as sending unwanted communications to users 110 that will never interact with or benefit from communications from the enterprise system 200. Second, the use of the data sharing application 232 also allows for certain portions of the personal data of the user 110 to be determined to be private and further allows for the computing system 206 to be simplified by means of the elimination of undesired interactions. Third, the data sharing application 232 provides greater insight and improved financial assessment of the users 110 by the third-party recipients, which in turn dramatically benefits the users 110 themselves. Each of the described advantages reduces network traffic as experienced by the computing system 206 due to the ability to control the sharing of the personal data of the user 110 via the data sharing application 232 via the GUI.

Particular embodiments and features have been described with reference to the drawings. It is to be understood that these descriptions are not limited to any single embodiment or any particular set of features. Similar embodiments and features may arise or modifications and additions may be made without departing from the scope of these descriptions and the spirit of the appended claims.

From the foregoing description, one ordinarily skilled in the art can easily ascertain the essential characteristics of this invention and, without departing from the spirit and scope thereof, can make various changes and modifications to the invention to adapt it to various usages and conditions.

What is claimed is:

1. A system for controlling network data sharing, the system comprising:

a computing system including at least one processor and at least one memory, wherein the computing system executes computer-readable instructions; and a network connection operatively connecting the computing system to at least one user device having a graphical user interface;

wherein, upon execution of the computer-readable instructions, the computing system is configured to:

provide, via the graphical user interface of the at least one user device, a data sharing application to a user, wherein the at least one user device is configured to wirelessly communicate with the computing system via the data sharing application;

provide, via the graphical user interface of the at least one user device, at least one data sharing preference related to user data for selection by the user, wherein the user data comprises personal data of the user;

receive, by the at least one processor from the at least one user device, at least one selection of the at least one data sharing preference related to the user data to control a sharing of the user data, which reduces network traffic experienced by the computing system, wherein the at least one data sharing preference includes at least one designated third-party recipient of the user data, a designated frequency at which the user data is shared with the at least one designated third-party recipient, and a designated duration at which the user data is shared with the at least one third-party recipient, and wherein the at least one designated third-party recipient is a recipient generated by the data sharing application based on the personal data of the user or a recipient generated by a machine learning program;

generate, by the at least one processor, designated user data for at least one designated third-party recipient based upon the at least one selection of the at least one data sharing preference by the user; and transmit, by the at least one processor, the designated user data to the at least one designated third-party recipient for the designated frequency and the designated duration.

2. The system of claim 1, wherein the network connection operatively connects the computing system to the designated at least one third-party recipient.

3. The system of claim 2, wherein the at least one processor is configured to transmit the designated user data to the at least one designated third-party recipient via the network connection.

4. The system of claim 2, wherein the at least one processor is configured to permit access to the designated user data by the at least one designated third-party recipient via the network connection.

5. The system of claim 1, wherein the at least one data sharing preference is selected by the user via the graphical user interface of the at least one user device.

6. The system of claim 1, wherein the at least one data sharing preference provided is associated with a specific user and the at least one designated third-party recipient.

7. The system of claim 1, wherein the designated user data is associated with one or more specific categories of third-party entities.

8. A method for controlling network data sharing, comprising the steps of:

providing a computing system including at least one processor in communication with at least one database, a memory device including readable instructions, and at least one user device in communication with the at least one processor via a network connection;

providing, via the graphical user interface of the at least one user device, a data sharing application to a user, wherein the at least one user device is configured to wirelessly communicate with the computing system via the data sharing application;

providing, via the graphical user interface of the at least one user device, at least one data sharing preference related to user data for selection by the user, wherein the user data comprises personal data of the user;

receiving, by the at least one processor from the at least one user device, at least one selection of the at least one data sharing preference related to the user data to control a sharing of the user data, which reduces network traffic experienced by the computing system, wherein the at least one data sharing preference includes at least one designated third-party recipient of the user data, a designated frequency at which the user data is shared with the at least one designated third-party recipient, and a designated duration at which the user data is shared with the at least one third-party recipient, and wherein the at least one designated third-party recipient is a recipient generated by the data sharing application based on the personal data of the user or a recipient generated by a machine learning program;

generating, by the at least one processor, designated user data for at least one designated third-party recipient based upon the at least one selection of the at least one data sharing preference by the user; and transmitting, by the at least one processor, the designated user data to the at least one designated third-party recipient based upon the at least one data sharing preference for the designated frequency and the designated duration.

9. The method of claim 8, wherein the network connection operatively connects the computing system to the at least one designated third-party recipient.

10. The method of claim 9, wherein the at least one processor is configured to transmit the designated user data to the at least one designated third-party recipient via the network connection.

11. The method of claim 9, wherein the at least one processor is configured to permit access to the designated user data by the at least one designated third-party recipient via the network connection.

12. The method of claim 8, wherein the at least one data sharing preference is selected by the user via the graphical user interface of the at least one user device.

13. The method of claim 8, wherein the at least one data sharing preference provided is associated with a specific user and the at least one designated third-party recipient.

14. The method of claim 8, wherein the designated user data is associated with one or more specific categories of third-party entities.

* * * * *